(12) United States Patent
Ganesan et al.

(10) Patent No.: US 8,588,225 B1
(45) Date of Patent: Nov. 19, 2013

(54) PHYSICAL RESOURCE TO VIRTUAL SERVICE NETWORK MAPPING IN A TEMPLATE BASED END-TO-END SERVICE PROVISIONING

(75) Inventors: Elango Ganesan, Palo Alto, CA (US); Lawrence Rolfe Kreeger, Fremont, CA (US); Song Lu, San Jose, CA (US); Michael Freed, Pleasanton, CA (US); Arijit Mukherji, Fremont, CA (US); Rituraj Kirti, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 971 days.

(21) Appl. No.: 12/168,836

(22) Filed: Jul. 7, 2008

(51) Int. Cl.
*H04L 12/28* (2006.01)
*G06F 15/173* (2006.01)

(52) U.S. Cl.
USPC .......................................... 370/389; 709/226

(58) Field of Classification Search
USPC .................. 370/389, 254; 714/7, 21; 709/226
See application file for complete search history.

(56) References Cited

U.S. PATENT DOCUMENTS

| | | | |
|---|---|---|---|
| 6,484,173 B1* | 11/2002 | O'Hare et al. | 707/999.009 |
| 6,859,889 B2* | 2/2005 | Matsuura et al. | 714/7 |
| 7,117,273 B1 | 10/2006 | O'Toole et al. | |
| 7,170,862 B1* | 1/2007 | Mountcastle | 370/254 |
| 2005/0044301 A1 | 2/2005 | Vasilevsky et al. | |
| 2005/0120160 A1 | 6/2005 | Plouffe et al. | |
| 2005/0232285 A1 | 10/2005 | Terrell et al. | |
| 2005/0281272 A1* | 12/2005 | Chandrapal | 370/401 |
| 2006/0143517 A1* | 6/2006 | Douceur et al. | 714/21 |
| 2006/0242299 A1 | 10/2006 | Karger et al. | |
| 2007/0220376 A1* | 9/2007 | Furukawa | 714/57 |
| 2007/0260911 A1* | 11/2007 | Marilly et al. | 714/4 |
| 2008/0288661 A1* | 11/2008 | Galles | 710/3 |
| 2009/0119673 A1* | 5/2009 | Bubba | 718/104 |
| 2009/0199177 A1* | 8/2009 | Edwards et al. | 718/1 |
| 2009/0241108 A1 | 9/2009 | Edwards et al. | |
| 2009/0300605 A1 | 12/2009 | Edwards et al. | |
| 2009/0307597 A1* | 12/2009 | Bakman | 715/736 |

OTHER PUBLICATIONS

IBM—IBM Tivoli Intelligent Orchestrator—Tivoli Intelligent Orchestrator—Software, http://www.306.ibm.com/software/tivoli/products/intell-orch, printed Jul. 2, 2008 (2 pages).
Veritas OpForce, http://www.symantec.qassociates.co.uk/server-provisioning-veritas-opforce.htm, printed Jul. 2, 2008 (3 pages).
Opsware: The leader in Data Center Automation, http://www.opsware/ro/, printed Jul. 2, 2008 (2 pages).

(Continued)

*Primary Examiner* — Dang Ton
*Assistant Examiner* — Kevin Lee
(74) *Attorney, Agent, or Firm* — Weaver Austin Villeneuve & Sampson LLP

(57) ABSTRACT

In one embodiment, the system may identify a virtual network, the virtual network including a plurality of virtual entities and connections among the plurality of virtual entities, wherein each of the plurality of virtual entities is mapped to one or more of a plurality of resources such that the virtual network is mapped to a physical network. The system may automatically obtain data during operation of the physical network, and provide a representation of the virtual network and the data obtained during operation of the physical network.

21 Claims, 8 Drawing Sheets

(56) References Cited

OTHER PUBLICATIONS

Opsware Orchestrator, http:www.opsware.com/products/orchestrator.php, printed Jul. 2, 2008 (2 pages).

HP Server Automation software—HP—BTO Software, http://www.hp.com/cda/hpms/display/main/hpms, printed Jul. 2, 2008, (2 pages).

HP Service Automation Visualizer software—HP—BTO Software, http://www.hp.com/cda/hpms/display/main/hpms, printed Jul. 2, 2008, (1 page).

HP Network Automation Software—HP—BTO Software, http://www.hp.com/cda/hpms/display/main/hpms, printed Jul. 2, 2008 (1 page).

HP Live Network Service—HP—BTO Software, http://www.hp.com/cda/hpms/display/main/hpms, printed Jul. 2, 2008 (1 page).

HP Data Center Automation Center—HP—BTO Software, http://www.hp.com/cda/hpms/display/main/hpms, printed Jul. 2, 2008, (2 pages).

HP Service Automation Reporter software—HP—BTO Software, http://www.hp.com/cda/hpms/display/main/hpms, printed Jul. 2, 2008, (1 pages).

Plumelle et al., "Physical Resource Life-Cycle in a Template Based Orchestration of End-to-end Service Provisioning," U.S. Application filed Jul. 7, 2008.

US Non-Final Office Action dated Mar. 4, 2010, from U.S. Appl. No. 12/168,831.

US Final Office Action dated Aug. 19, 2010, from U.S. Appl. No. 12/168,831.

\* cited by examiner

PHYSICAL RESOURCE TO VIRTUAL SERVICE NETWORK MAPPING IN A TEMPLATE BASED END-TO-END SERVICE PROVISIONING

BACKGROUND

1. Technical Field

The present disclosure relates generally to methods and apparatus for mapping physical resources to a virtual network.

2. Description of the Related Art

Networks such as data centers are often configured by different teams of individuals. As a result, it often takes 3 to 6 months to deploy a particular network, due to manually coordinated configuration steps on different devices by different teams. Unfortunately, long lead times for provisioning and over provisioning of resources are common problems. Moreover, debugging such networks is typically difficult due to the lack of accessible data regarding physical devices and configurations.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order to simplify the description.

OVERVIEW

In one embodiment, the system may identify a virtual network, the virtual network including a plurality of virtual entities and connections among the plurality of virtual entities, wherein each of the plurality of virtual entities is mapped to one or more of a plurality of resources such that the virtual network is mapped to a physical network. The system may automatically obtain data during operation of the physical network, and provide a representation of the virtual network and the data obtained during operation of the physical network.

SPECIFIC EXAMPLE EMBODIMENTS

In accordance with various embodiments, the system manages resources. For example, the resources may include physical hardware such as switches, servers, firewalls, data storage equipment, load balancers, etc. As another example, the resources may include software or other resources, such as virtual local area networks (VLANs), virtual storage area networks (VSANs), etc.

In accordance with one embodiment, resources may be allocated in association with a set of one or more network devices. This allocation may be in association with a physical network, or may be in association with a virtual network (i.e., template). Such a virtual network is a virtual entity that may also be referred to as a service network, which may include or otherwise support a software application. The virtual network may include a plurality of virtual entities, where each of the virtual entities may be mapped to a set of one or more resources (or resource pools). A virtual entity may represent a particular physical entity and/or function. For example, a virtual entity may be a virtual server, which may be mapped to a physical server, Ethernet switch ports, and storage. In this manner, a virtual network may be mapped to a physical network.

Figure 1:
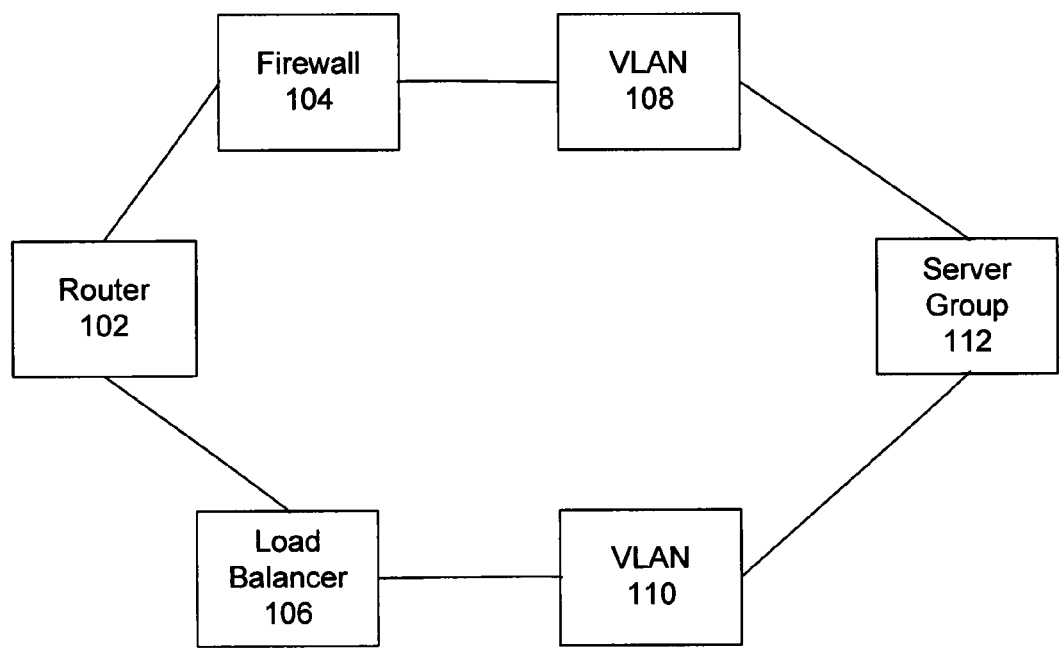
FIG. 1 is a diagram illustrating an example template.

FIG. 1 is a diagram illustrating an example template. The template represents a set of virtual entities and connections among these virtual entities. In this example, the template includes a router 102, a firewall 104, a load balancer 106, VLANs 108, 110, and a server group 112 including one or more servers. As shown in this example, the template may also specify connections among the virtual entities 102-112. These connections may be specified, for example, by identifying networks or sub-networks associated with each connection. Each of the virtual entities 102-112 may be implemented by one or more resources and/or one or more pools of resources. In order to specify a particular implementation, one or more resources and/or pools of resources may be allocated to (i.e, assigned to) the template or virtual context within which the template has been defined.

Figure 2:
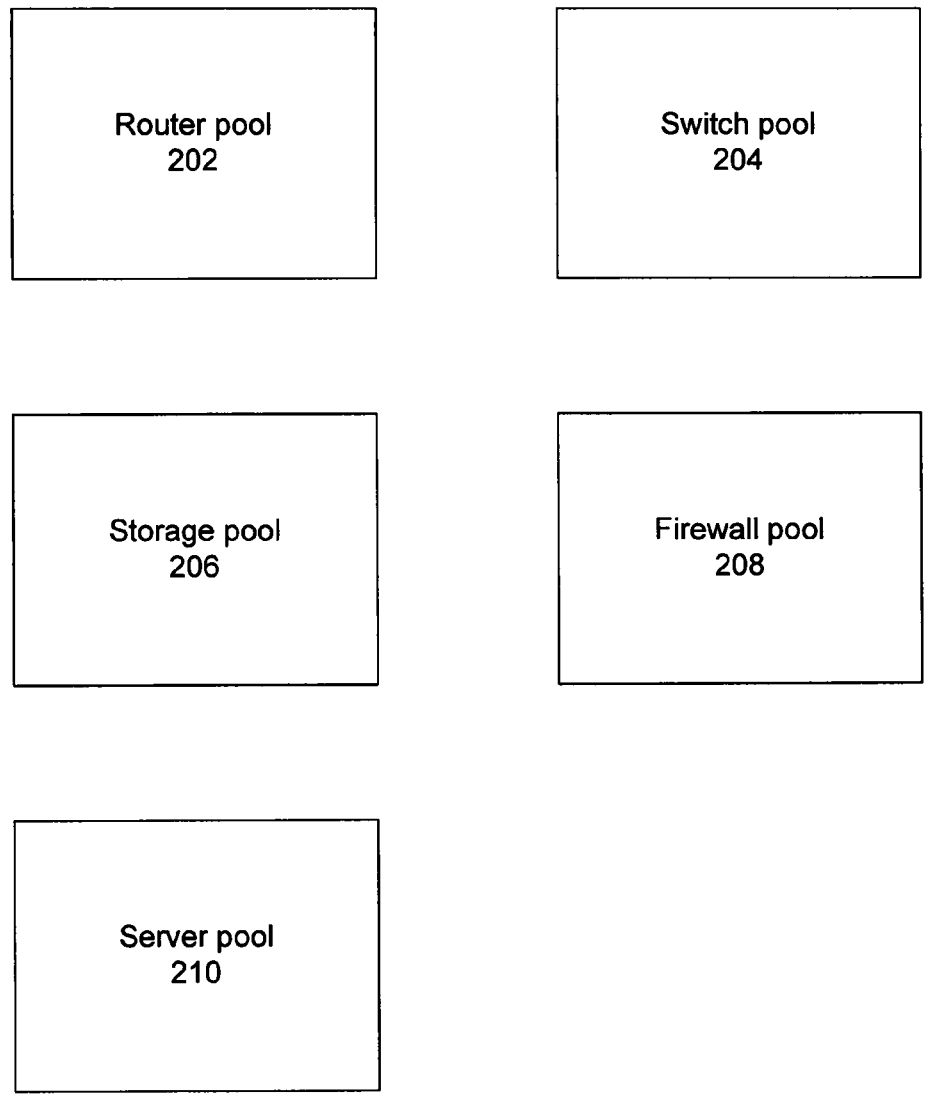
FIG. 2 is a diagram illustrating an example set of resource pools in accordance with one embodiment.

FIG. 2 is a diagram illustrating an example set of resource pools in accordance with one embodiment. In this example, there are five resource pools: a router pool 202 including one or more routers, a switch pool 204 including one or more switches, a storage pool 206 including one or more storage devices (e.g., disk arrays, Logical Units (LUNs), etc.), a firewall pool 208 including one or more firewalls, and a server pool 210 including one or more servers. It is important to note that these resource pools are merely examples, and therefore other types of resources (or subsets of resources) may be grouped in a resource pool.

Each resource pool may include one or more resources of the type included in that pool. A resource pool may be static (list-based) or dynamic. For example, a dynamic resource pool can be based upon query criteria, where a resource may be automatically included in a particular resource pool where the resource satisfies the resource pool's query criteria. In one embodiment, those resources that are in a managed state can be included on one or more resources pools, as will be described in further detail below. Each resource pool (or portion thereof) can be assigned to one or more virtual contexts, as will be described in further detail with reference to FIG. 3.

Figure 3:
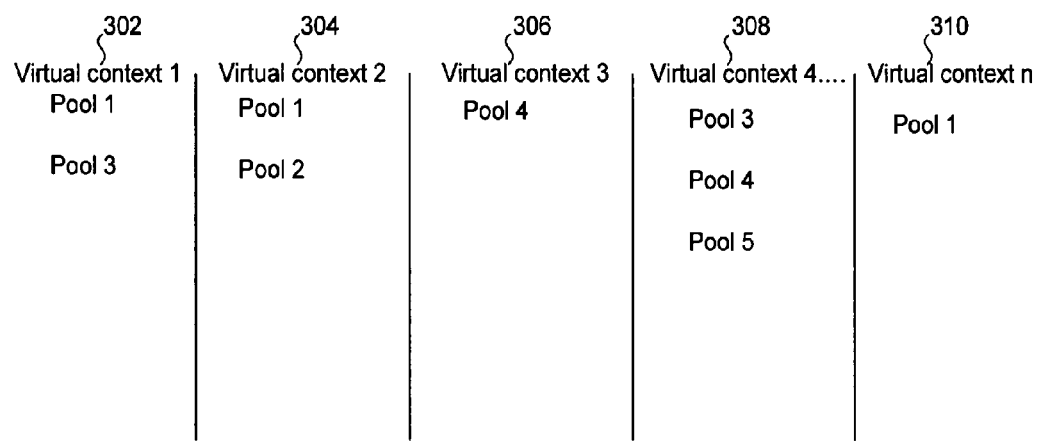
FIG. 3 is a diagram illustrating example virtual contexts that may be implemented in accordance with one embodiment.

FIG. 3 is a diagram illustrating example virtual contexts that may be implemented in accordance with one embodiment. The system may support a plurality of virtual contexts. In this example, the virtual contexts include virtual context 1 302, virtual context 2 304, virtual context 3 306, virtual context 4 308, and virtual context n 310. A set of resources including at least a portion of one or more of the resource pools may be assigned to each virtual context (e.g., from a general administrative domain). In this example, pool 1 and pool 3 have been assigned to virtual context 1 302, pool 1 and pool 2 have been assigned to virtual context 2 304, pool 4 has been assigned to virtual context 3 306, pools 3, 4, and 5 have been assigned to virtual context 4 308, and pool 1 has been assigned to virtual context n 310. Thus, the virtual contexts may share access to various resources. For example, virtual context 1 302, virtual context 2 304, and virtual context n share access to pool 1. Of course, the virtual contexts may also have exclusive access to various resources. In this example, virtual context 3 306 has exclusive access to pool 5.

Each virtual context may represent an administrative domain via which a corresponding set of resources may be visible to users associated with that domain, enabling the users to assign (i.e., allocate) any of the set of resources to virtual entities within a virtual network. For example, a user may login to an administrative domain in order to access the corresponding set of resources. As set forth above, those resources that are visible may be managed resources.

Once a user logs into a virtual context, the user may assign a resource or resource pool to the virtual context. Similarly, the user may also un-assign a resource or resource pool from the virtual context. In one embodiment, un-assignment may not be permitted if the resource or resource pool has been assigned to a virtual network defined in the virtual context.

One or more rules may be created in association with a virtual context. For example, a rule may indicate privileges associated with a user or the user's role. For example, a storage administrator may be allowed to discover and inventory storage resources, while a template designer may only be allowed to create a template.

In order to create a physical network, a template (i.e., virtual network) may be deployed in a physical network using specific resources or resource pools. In other words, individual resources and/or resource pools may be assigned to virtual entities in the virtual network.

Figure 4A:
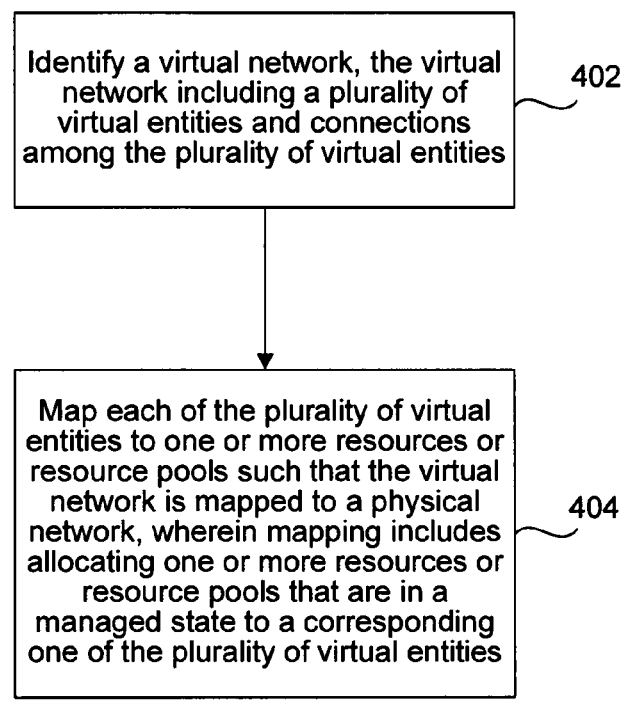
FIG. 4A is a process flow diagram illustrating an example method of allocating resources to a virtual network.

Assignment of resources or resource pools to virtual entities represented by a template may be performed in response to user input or may be performed automatically. FIG. 4A is a process flow diagram illustrating an example method of allocating resources to a virtual network. The system identifies a virtual network at 402, the virtual network including a plurality of virtual entities and connections among the plurality of virtual entities. The system may then map each of the plurality of virtual entities to one or more resources or resource pools such that the virtual network is mapped to a physical network at 404. More specifically, mapping may be performed by allocating one or more resources or resource pools that are in a managed state to a corresponding one of the plurality of virtual entities. Such allocation may be performed in response to user input, or automatically.

Figure 4B:
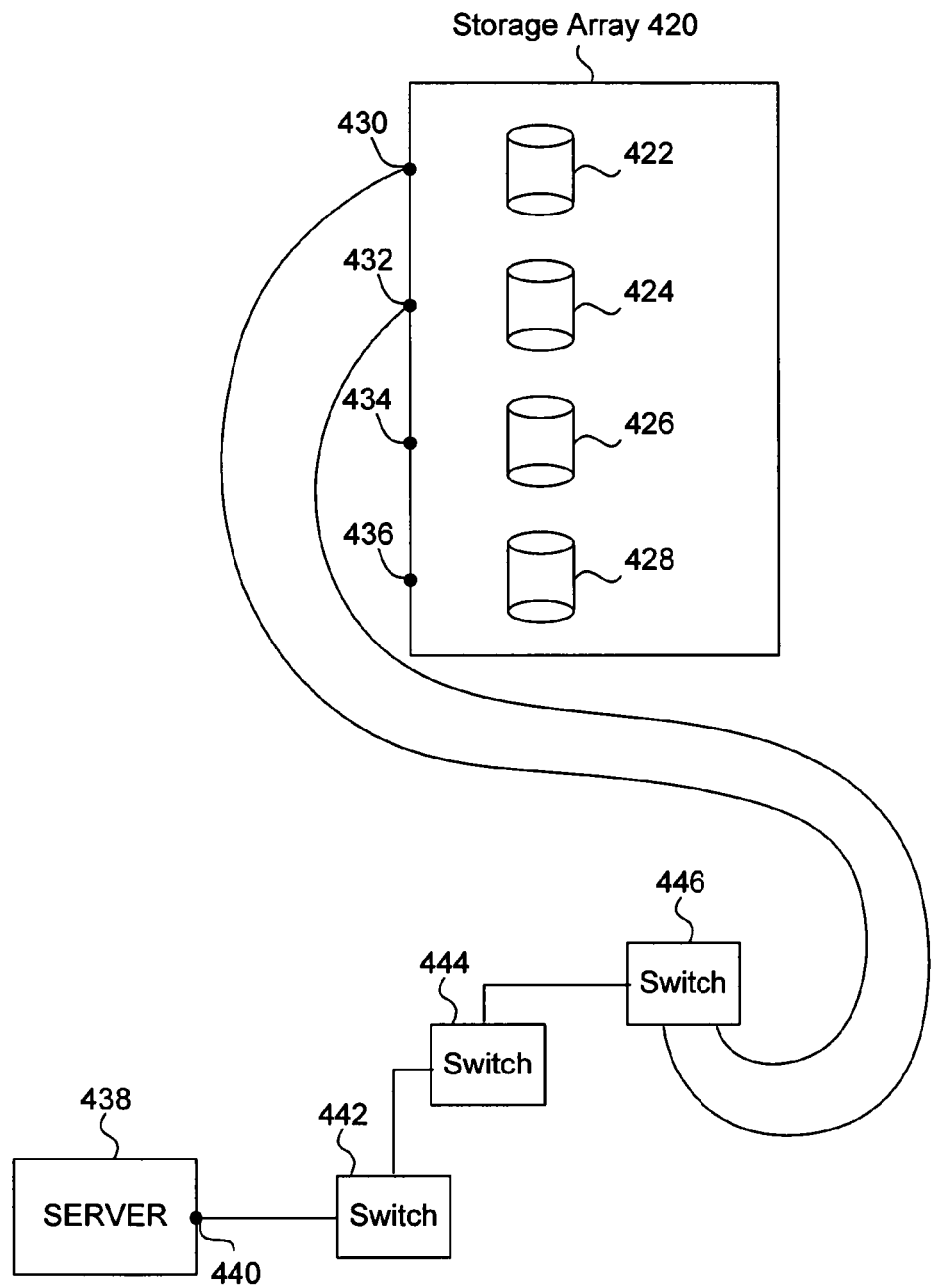
FIG. 4B is a diagram illustrating an example system in which resources may be automatically allocated.

FIG. 4B is a diagram illustrating an example system in which resources may be automatically allocated. As shown in this example, a storage array 420 may include a set of disks 422, 424, 426, 428, which may be referred to as LUNs. The storage array 420 may include one or more storage array ports 430, 432, 434, 436. A network device (e.g., server) 438 may be coupled to the storage array 420 via one or more server ports 438, 440. In this example, the server 438 is coupled to the storage array 420 via a set of switches 442, 444, 446. It is important to note that although a single server is shown in this example, multiple servers may be coupled to the same storage array 420. Similarly, one or more servers may access each of the LUNs 422, 424, 426, 428. In other words, a LUN may be shared or dedicated to a set of one or more servers.

A variety of processes may be performed in order to allocate one or more LUNs and/or storage array ports to a network device such as a server. Various examples that will be described herein include the round-robin algorithm, the greedy algorithm, and the saturation algorithm.

In accordance with one embodiment, when a dedicated LUN is to be assigned to a server, a LUN of the appropriate size may be selected. A set of one or more of the storage array ports that the LUN can use to communicate with the server may be selected. A round-robin algorithm may be used to select the next storage array port that is not fully saturated. Saturation may be determined using a variety of metrics (e.g., bandwidth, load, etc.).

In accordance with another embodiment, the greedy algorithm may be used to apply a metric in order to assign a storage array port to a server. For example, the metric may be based upon factors such as load and/or bandwidth. The system may maintain a list of storage array ports, where each of the storage array ports has a value associated with the metric. For each LUN chosen by the system, one of the storage array ports having the minimum (or maximum) metric value is selected.

In accordance with yet another embodiment, a saturation algorithm may be applied in order to assign a storage array port to a server. Specifically, the saturation algorithm may apply a metric to determine a metric value associated with a storage array port. The metric may be based upon factors such as load and/or bandwidth. The system may maintain a list of storage array ports, where each of the storage array ports has a value associated with the metric. For each LUN chosen by the system, a chosen storage array port is reused until the storage array port is fully saturated, as determined by the corresponding metric value.

A port associated with the server (e.g., a server port or a port associated with a gateway that performs translation) may be mapped to each corresponding storage array port in order to allow the server to access the selected LUN(s). The server port may be identified by a world wide port name (WWPN). The server port association may be performed automatically, or manually.

In accordance with one embodiment, a shared LUN may be allocated to multiple servers. For example, a pre-existing shared LUN may be allocated to a newly created server in a pool of servers. The system may maintain a list of the mapping between the resources and/or resource pools and the virtual entities until all iterations of the desired algorithm are applied. An identifier of each of the LUNs may then be supplied to the server(s) to which the LUNs have been allocated. When the mapping has been successfully completed for all virtual servers, the mapping may be stored in association with the virtual network.

In order to ensure that a server has access to a particular LUN, the system may ensure that the server (or server port) and corresponding LUN(s)/storage array port(s) are in the same VSAN. For example, the system may automatically associate the server (or server port) and corresponding LUN(s)/storage array port(s) with a particular VSAN. Moreover, it may also be desirable to set up a zone in which the server and the disk array are permitted to communicate.

In accordance with one embodiment, the system may manage the resources using a resource life-cycle model. For example, the life-cycle of a resource may include a number of states, such as a discovery phase, managed state, maintenance state (which may include other sub-states), and an unmanaged state.

In one embodiment, resources may be added to the system or discovered. Newly discovered or added resources may be put in an unmanaged state. While resources are in the unmanaged state, the resources may not be allocated for use by virtual entities, network devices or applications.

Figure 5:
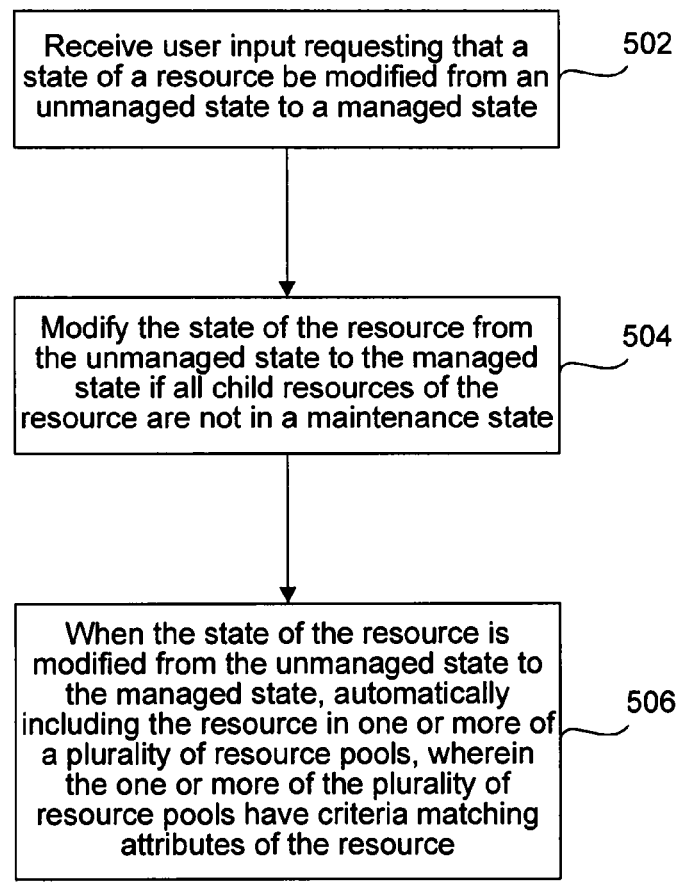
FIG. 5 is a process flow diagram illustrating an example method of managing resources in accordance with one embodiment.

FIG. 5 is a process flow diagram illustrating an example method of managing resources in accordance with one embodiment. The system may receive user input requesting that a state of a resource be modified from an unmanaged state to a managed state at 502. The system may modify the state of the resource from the unmanaged state to the managed state if all child resources of the resource are not in a maintenance state at 504. When the state of the resource is modified from the unmanaged state to the managed state, the system may automatically include the resource in one or more of a plurality of resource pools, wherein the one or more of the plurality of resource pools have criteria matching attributes of the resource at 506. For example, such criteria may indicate a type of resource (e.g., memory, switch, router, etc.).

Managed State

Once the resource is in the managed state, the resource may be visible for use in provisioning. For example, where the resource is included in a particular pool, those contexts that include that pool will enable users that log in to those contexts to provision the managed resource. Moreover, when a resource is managed, information associated with the resource such as its health and usage may be monitored. In one embodiment, managed resources cannot be deleted by a user. However, a user may choose to change the state of the resource from managed to unmanaged, as will be described in further detail below.

Resources that are in a managed state may be provisioned (i.e., allocated) to a virtual network. Such allocation may be initiated by a user or may be performed automatically. Various algorithms may be applied in order to allocate resources, as described above.

Maintenance State

A user may choose to modify the state of a resource to a maintenance state (e.g., from a managed state). If the resource is not in use by one or more network devices (e.g., associated with one or more virtual entities), the state of the resource may be changed from the managed state to the maintenance state. In accordance with one embodiment, when the resource is in the maintenance state, it cannot be allocated to or acquired (e.g., used) by a set of network devices. Moreover, automatic monitoring of the health of the resource may be suspended while the resource is in the maintenance state. The user may move the resource back to the managed state when the maintenance has completed. For example, the user may invoke a maintenance completed action.

Marked for Maintenance State

If a resource is in use by one or more network devices (e.g., associated with a virtual network) when a user requests that it be moved to the maintenance state, the resource may be moved to a marked for maintenance state. In the marked for maintenance state, the resource will not be acquired by additional network devices. When the resource is no longer in use by one or more network devices (e.g., when the resource is released), the state of the resource may be automatically modified from the marked for maintenance state to the maintenance state. In addition, the user may be notified of this change in state. While the resource is in the marked for maintenance state, the user may change their mind and move the resource back to the managed state by invoking a cancel maintenance action.

Unmanaged State

A user may change the state of a resource from managed to unmanaged by invoking an unmanage action. Unmanaged resources may no longer be visible in various virtual contexts, since they cannot be allocated for use by network devices (or an associated virtual network). However, the unmanaged resources may still be visible in a general resource management user interface.

Unmanaged resources may be moved back to the managed state by invoking the manage action. In one embodiment, when a parent resource (e.g., a switch) is changed to the managed state, the system may check if each of the parent's child resources (e.g., modules of the switch) is in the managed state. If not, the system may move the state of the parent's child resources to managed. Of course, if any of the child resources cannot be moved to the managed state (e.g., where they are in the maintenance state), the system may not move the state of the parent to managed. For example, where a user attempts to invoke a manage operation on a server, the system may check if the switch that the server is connected to is in the managed state. If not, the system may attempt to change the state of the switch to the managed state. Unmanaged resources may also be deleted from the resource management user interface.

Similarly, a resource can be moved to the unmanaged state if the resource is not in use by any network devices (e.g., associated with a service network). In addition, the resource may not be moved to the unmanaged state if the resource has been assigned to one or more network devices (or virtual networks). The system may also determine whether the resource has one or more child resources. If the resource has one or more child resources, the system may determine whether the child resources are in the unmanaged state before changing the state of the parent resource to the unmanaged state. If the child resources are not already in the unmanaged state, the system may determine whether any of these child resources are in use by (or have been assigned to) any network devices (or service networks). If any of the child resources are in use (or have been assigned), the system may not change the state of these child resources to the unmanaged state and therefore the system may not change the state of the resource to the unmanaged state.

Resource Visibility

Resources may be "visible" to a user via a user interface based upon its lifecycle state. For example, resources that are in the managed state may be visible. Moreover, resources may be visible to a user based upon the virtual context with which the user is associated. Where each virtual context represents a different administrative domain, a user may log into his or her domain in order to manage resources that are visible to users of that domain. Managed resources and pools containing them can be individually assigned to one or more virtual contexts, enabling the managed resources to be acquired (e.g., used) by one or more network devices (or an associated virtual network). Once a resource is assigned to a virtual context, the resource may automatically appear in a dynamic criteria based pool that is present in that virtual context. In one embodiment, one of the virtual contexts may be a general administrative context in which resources are initially placed.

Hardware Replacement

In one embodiment, it may be possible to replace a resource that is no longer available. For instance, a resource that was previously in a managed state may be in the unmanaged state or the maintenance state, and therefore no longer available. If a new hardware resource is made available (e.g., present in the general administrative context) and the new hardware resource has the same configuration (e.g., same modules and/or capabilities) as the unavailable resource, the unavailable resource may be replaced by the new resource. For instance, a specific fault may be raised on the unavailable resource. The unavailable resource may then be automatically replaced by the new resource. Alternatively, a user may invoke a replace resource action. In either case, the system may update its inventory of resources, use the new hardware resource in place of the unavailable resource, and/or clear the fault.

Figure 6:
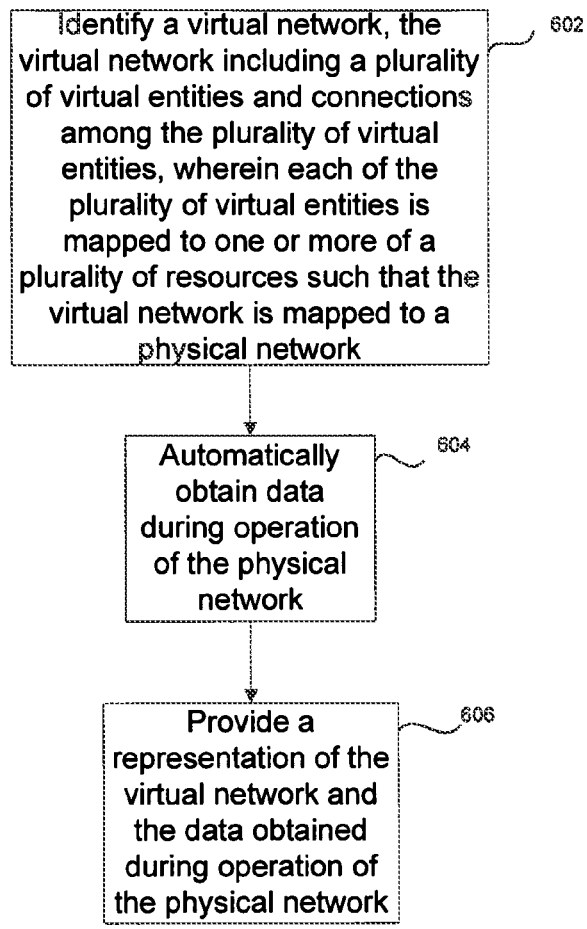
FIG. 6 is a process flow diagram illustrating an example method of performing physical resource to virtual network mapping.

It is typically difficult to debug networks due to the lack of accessible data regarding physical devices and configurations. FIG. 6 is a process flow diagram illustrating an example method of performing physical resource to virtual network mapping, enabling a physical network to be more easily debugged. The system may maintain information identifying a virtual network at 602, the virtual network including a plurality of virtual entities and connections among the plurality of virtual entities, wherein each of the plurality of virtual entities is mapped to one or more of a plurality of resources such that the virtual network is mapped to a physical network. The system may automatically obtain data during operation of the physical network at 604. The system may provide (e.g., display) a representation of the virtual network and the data obtained during operation of the physical network at 606. For instance, the system may provide a user interface that displays a representation of the virtual network and any data that has been obtained during operation of the physical network. Such a representation may include text, as well as any visual representation (e.g., chart or diagram).

The data that is obtained and presented may include a wide variety of data. For instance, the data may indicate an identity of the one or more of the plurality of resources that are in use during operation of the physical and corresponding virtual network. The data may further indicate an amount of at least one of the plurality of resources that is in use (e.g., by the virtual network and/or other virtual networks). Specifically, the system may identify a subset of the plurality of resources that is mapped to the plurality of virtual entities and are in use by a virtual network and the corresponding physical network. The system may then provide or otherwise indicate an identity of the subset of the plurality of resources that are currently in use. For instance, the system may provide a visual indicator in the user interface that indicates those resources that are currently in use.

Similarly, it may be desirable to access data associated with a particular virtual entity in the virtual network. For instance, a user may wish to identify those resources that are mapped to a particular virtual entity. In one embodiment, the user may click on one of the virtual entities in the virtual network via a user interface. The system may identify a subset (e.g., one or more) of the plurality of resources, where the subset of the plurality of resources is mapped to a selected one of the plurality of virtual entities. For example, a virtual server may be mapped to a physical server, Ethernet switch ports, and associated storage. The system may then provide or otherwise indicate an identity of the subset of the plurality of resources via the user interface.

Where a fault (e.g., failure) occurs with respect to one of the resources in the physical network, the system may propagate the fault from the resource to the virtual network. More specifically, the system may propagate the fault to each of the plurality of virtual entities to which the resource is mapped. For instance, a visual indicator may be provided in the user interface to indicate those virtual entities that are effected by the fault. The system may also send a notification to a particular individual or group of individuals of the fault. For instance, an email address may be associated with the virtual entity or resource.

For example, where the system ascertains that a load balancer has experienced a failure, a fault condition may be raised on that resource. The system may then propagate the fault to all virtual load balancer entities that were mapped to the physical (e.g., software) load balancer. The system may notify the administrator of the effected virtual networks that the service provided by these virtual networks may be impacted by the failure.

Where a fault has been observed on a virtual entity, the system may identify a subset of the plurality of resources that is mapped to one of the plurality of virtual entities. The system may then use this information to automatically initiate a troubleshooting application on the subset of the plurality of resources. Moreover, the system may automatically replace a faulty resource.

The system may also enable a user to ascertain those virtual networks and/or virtual entities in those networks that are using a particular resource (e.g., physical switch). The system may then provide this information via the user interface. This would enable a user to identify those virtual networks and/or virtual entities that would be impacted when a particular physical resource is to be maintained.

The system may also obtain and present historical data associated with various resources. For instance, the system may maintain and provide (e.g., display) past usage information associated with at least one of the plurality of resources. More specifically, this past usage information may be associated with a single virtual network, or all virtual networks that may be accessing the resource(s). Moreover, past usage information may also be associated with a single virtual entity. It is also important to note that the plurality of resources may also include resource pools. Thus, the system may provide (e.g., display) historical usage data for individual resources, as well as resource pools. In this manner, a user may view the usage of a particular resource or resource pool over time. Such past usage data may be useful, for example, in generating a bill based upon usage of various resources.

Historical usage may include information such as the average usage of a resource or resource pool over time, as well as the average usage of a resource or resource pool by a particular network (e.g., virtual network). A resource or resource pool may be "in use" from the time a physical network is created or during operation of the physical network (e.g., when the resource or resource pool is actually acquired). For instance, a resource may be acquired when another resource has failed, or during a load balancing operation. The time at which a resource or resource pool is no longer "in use" may be the time that the resource or resource pool is "released" or when the physical network is no longer in operation.

Other Embodiments

Generally, the disclosed techniques may be implemented on software and/or hardware. For example, they can be implemented in an operating system kernel, in a separate user process, in a library package bound into network applications, on a specially constructed machine, or on a network interface card. In a specific embodiment, the disclosed techniques are implemented in software such as an operating system or in an application running on an operating system.

A software or software/hardware hybrid implementation of the disclosed embodiments may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, various embodiments may be implemented in specially configured routers or servers available from Cisco Systems, Inc. of San Jose, Calif. A general architecture for some of these machines will appear from the description given below. In an alternative embodiment, the disclosed techniques may be implemented on a general-purpose network host machine such as a personal computer or workstation. Further, the disclosed embodiments may be at least partially implemented on a card (e.g., an interface card) for a network device or a general-purpose computing device.

Figure 7:
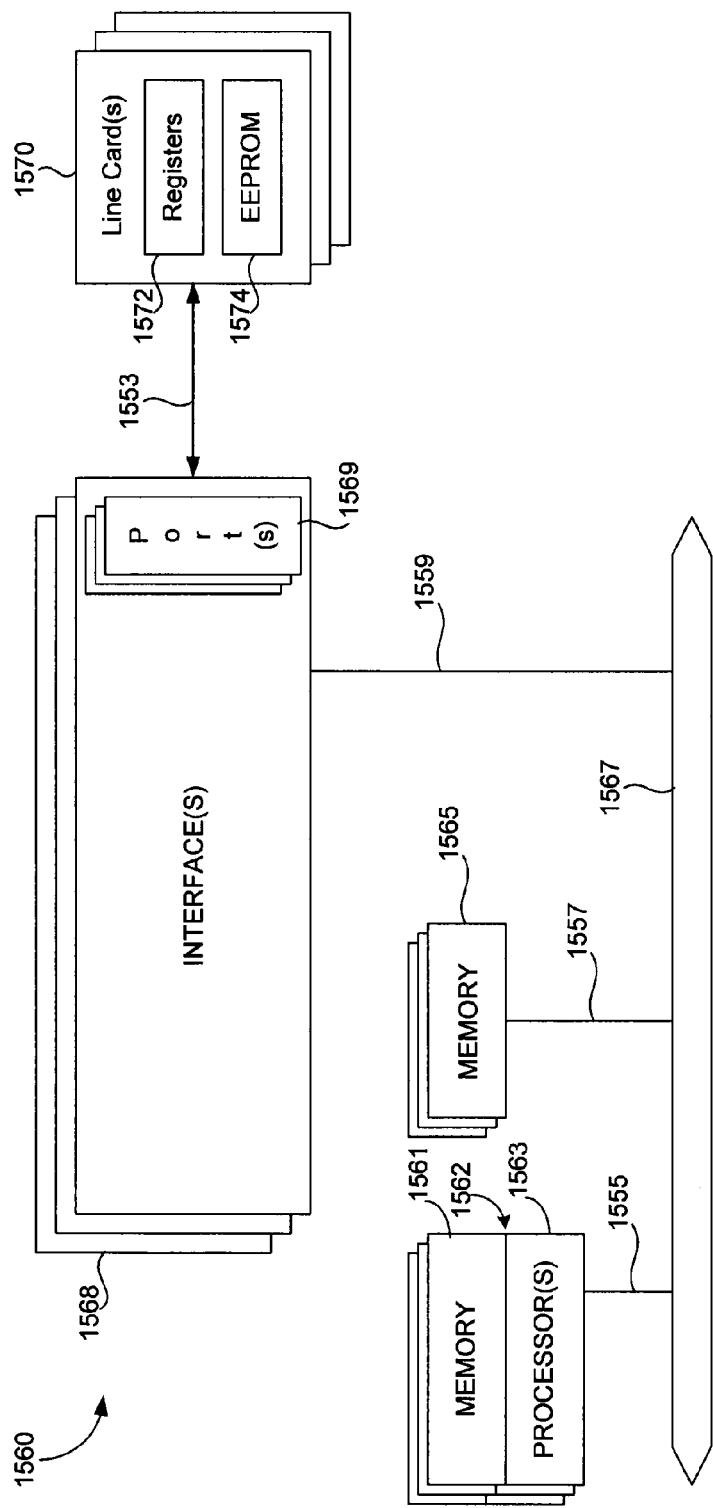
FIG. 7 is a diagrammatic representation of an example network device in which various embodiments may be implemented.

Referring now to FIG. 7, a network device 1560 suitable for implementing the disclosed embodiments includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. The CPU 1562 may accomplish these functions under the control of software including an operating system (e.g. Windows NT), and any appropriate application software.

CPU 1562 may include one or more processors 1563 such as a processor from the Motorola family of microprocessors or the MIPS family of microprocessors. In an alternative embodiment, processor 1563 may include specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 7 illustrates one specific network device, it is by no means the only network device architecture on which the disclosed embodiments can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM. Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
deploying a template representing a virtual network within one of a plurality of virtual contexts such that the template is mapped to a physical network, the virtual network including a plurality of virtual entities and connections among the plurality of virtual entities, wherein deploying is performed such that each of the plurality of virtual entities is mapped to one or more of a plurality of resources that have been allocated to the one of the plurality of virtual contexts;
automatically obtaining data during operation of the physical network;
providing a representation of the virtual network and the data obtained during operation of the physical network via a graphical user interface;
allocating the plurality of resources to the one of the plurality of virtual contexts;
identifying a subset of the plurality of resources, wherein the subset of the plurality of resources are mapped to the plurality of virtual entities and are in use by the corresponding physical network; and
indicating an identity of the subset of the plurality of resources via the graphical user interface;
wherein each of the plurality of virtual contexts represents a different administrative domain accessible to a corresponding group of users.

2. The method as recited in claim 1, wherein the data indicates an amount of the one or more of the plurality of resources that are in use during operation of the physical network.

3. The method as recited in claim 1, further comprising:
maintaining past usage information associated with the one or more of the plurality of resources; and
providing the past usage information via the graphical user interface.

4. The method as recited in claim 1, further comprising:
identifying a subset of the plurality of resources, wherein the subset of the plurality of resources is mapped to one of the plurality of virtual entities; and
providing an identity of the subset of the plurality of resources via the graphical user interface.

5. The method as recited in claim 1, further comprising:
identifying at least one of the plurality of resources that is mapped to one of the plurality of virtual entities; and
initiating a troubleshooting application on the at least one of the plurality of resources.

6. The method as recited in claim 1, further comprising:
identifying one or more virtual networks that are using a selected one of the plurality of resources, wherein the selected one of the plurality of resources has been selected by a user via a graphical user interface.

7. The method as recited in claim 1, further comprising:
identifying one or more virtual entities in the virtual network that are using a selected one of the plurality of resources, wherein the selected one of the plurality of resources has been selected by a user via a graphical user interface.

8. The method as recited in claim 1, further comprising:
maintaining historical usage data associated with one or more of a plurality of resource pools, each of the plurality of resource pools storing resources of a corresponding resource type; and
providing the historical usage data for at least one of the plurality of resource pools via the graphical user interface.

9. The method as recited in claim 8, wherein the historical usage data is associated with a selected virtual network, wherein the selected virtual network has been selected by a user via a graphical user interface.

10. The method as recited in claim 1, further comprising:
maintaining historical usage data associated with at least one of the plurality of resources; and
providing the historical usage data for the at least one of the plurality of resources via the graphical user interface.

11. The method as recited in claim 10, wherein the historical usage data is associated with a selected virtual network, wherein the selected virtual network has been selected by a user via a graphical user interface.

12. The method as recited in claim 1, further comprising:
propagating a fault from one of the plurality of resources to the virtual network and each of the plurality of virtual entities to which the one of the plurality of resources is mapped.

13. The method as recited in claim 12, further comprising:
sending a notification of a failure of the one of the plurality of resources.

14. The method as recited in claim 1, wherein allocating is performed such that the one of the plurality of virtual contexts has exclusive access to at least a portion of the plurality of resources.

15. An apparatus, comprising:
a processor; and
a memory, at least one of the processor or the memory being further adapted for:
deploying a template representing a virtual network within one of a plurality of virtual contexts such that the template is mapped to a physical network, the virtual network including a plurality of virtual entities and connections among the plurality of virtual entities, wherein deploying is performed such that each of the plurality of virtual entities is mapped to one or more of a plurality of resources that have been allocated to the one of the plurality of virtual contexts;
automatically obtaining data during operation of the physical network;
providing a representation of the virtual network and the data obtained during operation of the physical network via a graphical user interface;
allocating the plurality of resources to the one of the plurality of virtual contexts;
wherein each of the plurality of virtual contexts represents a different administrative domain accessible to a corresponding group of users;
identifying a subset of the plurality of resources, wherein the subset of the plurality of resources are mapped to the plurality of virtual entities and are in use by the corresponding physical network; and
indicating an identity of the subset of the plurality of resources via the graphical user interface.

16. The apparatus as recited in claim 15, wherein the data indicates an amount of the one or more of the plurality of resources that are in use during operation of the physical network.

17. The apparatus as recited in claim 15, at least one of the processor or the memory being further adapted for:
maintaining past usage information associated with the plurality of resources; and
providing the past usage information via the graphical user interface.

18. The apparatus as recited in claim 15, at least one of the processor or the memory being further adapted for performing steps further comprising allocating the plurality of resources to the one of the plurality of virtual contexts, wherein allocating is performed in response to input from a user in the group of users that have access to the one of the plurality of contexts.

19. A non-transitory computer-readable medium storing thereon computer-readable instructions, comprising:
instructions for deploying a template representing a virtual network within one of a plurality of virtual contexts such that the template is mapped to a physical network, the virtual network including a plurality of virtual entities and connections among the plurality of virtual entities, wherein deploying is performed such that each of the plurality of virtual entities is mapped to one or more of a plurality of resources that have been allocated to the one of the plurality of virtual contexts;
instructions for automatically obtaining data during operation of the physical network;
instructions for providing a representation of the virtual network and the data obtained during operation of the physical network via a graphical user interface;
instructions for allocating the plurality of resources to the one of the plurality of virtual contexts;
wherein deploying is performed such that the virtual network is automatically mapped to a physical network;
instructions for identifying a subset of the plurality of resources, wherein the of the plurality of resources is mapped to one of the plurality of virtual entities and are in use by the corresponding physical network; and
instructions for providing an identity of the subset of the plurality of resources via the graphical user interface;

wherein each of the plurality of virtual contexts represents a different administrative domain accessible to a corresponding group of users.

20. The non-transitory computer-readable medium as recited in claim 19, further comprising:
   instructions for identifying one or more virtual networks that are using a selected one of the plurality of resources, wherein the selected one of the plurality of resources has been selected by a user via a graphical user interface.

21. The non-transitory computer-readable medium as recited in claim 19, further comprising:
   instructions for identifying one or more virtual entities in the virtual network that are using a selected one of the plurality of resources, wherein the selected one of the plurality of resources has been selected by a user via a graphical user interface.

* * * * *